(12) United States Patent
Deegan et al.

(10) Patent No.: US 9,744,575 B2
(45) Date of Patent: Aug. 29, 2017

(54) TREATMENT OF WASTE

(75) Inventors: David Deegan, Bampton (GB); Fan Zhang, Swindon (GB)

(73) Assignee: Tectronics (International) Limited, Swindon (GB)

(*) Notice: Subject to any disclaimer, the term of this patent is extended or adjusted under 35 U.S.C. 154(b) by 2 days.

(21) Appl. No.: 14/112,321

(22) PCT Filed: Apr. 23, 2012

(86) PCT No.: PCT/GB2012/000374
§ 371 (c)(1),
(2), (4) Date: Nov. 15, 2013

(87) PCT Pub. No.: WO2012/143690
PCT Pub. Date: Oct. 26, 2012

(65) Prior Publication Data
US 2014/0066686 A1 Mar. 6, 2014

(30) Foreign Application Priority Data

Apr. 21, 2011 (GB) .................................. 1106960.6

(51) Int. Cl.
| | |
|---|---|
| B09B 3/00 | (2006.01) |
| F23G 5/08 | (2006.01) |
| A62D 3/19 | (2007.01) |
| B09C 1/06 | (2006.01) |
| F23G 5/02 | (2006.01) |

(Continued)

(52) U.S. Cl.
CPC ............... B09B 3/00 (2013.01); A62D 3/19 (2013.01); B09C 1/06 (2013.01); F23G 5/02 (2013.01); F23G 5/085 (2013.01); F23G 7/14 (2013.01); *A62D 2101/20* (2013.01); *A62D 2101/22* (2013.01); *A62D 2101/28* (2013.01); *F23G 2201/70* (2013.01);
(Continued)

(58) Field of Classification Search
None
See application file for complete search history.

(56) References Cited

U.S. PATENT DOCUMENTS

| | | | | |
|---|---|---|---|---|
| 4,989,522 A | * | 2/1991 | Cline ..................... | B01D 53/38 110/215 |
| 4,998,486 A | * | 3/1991 | Dighe et al. ................. | 110/346 |

(Continued)

FOREIGN PATENT DOCUMENTS

| | | | |
|---|---|---|---|
| CA | 2212471 | * | 6/1997 |
| CN | 1626293 A | | 6/2005 |

(Continued)

OTHER PUBLICATIONS

WHO Training Slides for the Health Sector (2008).*
(Continued)

*Primary Examiner* — Patricia L Hailey
*Assistant Examiner* — Sheng H Davis
(74) *Attorney, Agent, or Firm* — Senniger Powers LLP

(57) ABSTRACT

A method for the treatment of waste by plasma treating the waste to destroy the hazardous organic components and to yield a slag and an off-gas by plasma treating the waste in the presence of added oxygen gas in a transferred-arc plasma treatment unit, followed by directing off-gas from the plasma treatment unit to a thermal oxidizer combustion chamber.

16 Claims, 3 Drawing Sheets

(51) Int. Cl.
*F23G 7/14* (2006.01)
*A62D 101/20* (2007.01)
*A62D 101/22* (2007.01)
*A62D 101/28* (2007.01)

(52) U.S. Cl.
CPC ............. *F23G 2900/50212* (2013.01); *F23G 2900/7007* (2013.01); *F23G 2900/7011* (2013.01)

(56) References Cited

U.S. PATENT DOCUMENTS

| | | | |
|---|---|---|---|
| 5,055,196 A * | 10/1991 | Darian et al. ................. | 210/638 |
| 5,399,832 A * | 3/1995 | Tanisaki et al. ......... | 219/121.47 |
| 5,666,891 A | 9/1997 | Titus et al. | |
| 5,756,957 A * | 5/1998 | Titus et al. .................. | 588/311 |
| 6,018,471 A * | 1/2000 | Titus et al. .................. | 363/126 |
| 6,089,169 A * | 7/2000 | Comiskey ..................... | 110/233 |
| 6,155,182 A | 12/2000 | Tsangaris et al. | |
| 6,276,871 B1 * | 8/2001 | Bruso ....................... | B09C 1/02 405/128.5 |
| 2004/0181112 A1 * | 9/2004 | Essenter ................... | B09C 1/08 588/316 |
| 2007/0022913 A1 * | 2/2007 | Wang et al. ................. | 106/697 |
| 2007/0199485 A1 * | 8/2007 | Capote ................... | F23G 5/085 110/250 |
| 2009/0200180 A1 | 8/2009 | Capote et al. | |
| 2011/0079171 A1 * | 4/2011 | Capote ................... | F23G 5/006 110/250 |

FOREIGN PATENT DOCUMENTS

| | | | |
|---|---|---|---|
| CN | 101850357 | * | 10/2010 |
| DE | 4113440 | | 10/1992 |
| EP | 0354731 | | 2/1990 |
| JP | H0311217 A | | 1/1991 |
| JP | H05253557 A | | 10/1993 |
| JP | 2001324124 | * | 5/2000 |
| JP | 2000288510 A | | 10/2000 |
| JP | 2007296415 | | 11/2007 |
| JP | 2009172603 | | 8/2009 |
| JP | 2010213646 | * | 9/2010 |
| WO | 8200509 | | 2/1982 |
| WO | 8911448 | | 11/1989 |
| WO | 0105910 | | 1/2001 |
| WO | 02092249 | | 11/2002 |
| WO | 2005093323 A1 | | 10/2005 |
| WO | 2007000607 | | 1/2007 |

OTHER PUBLICATIONS

Abstract of DE4113440; Oct. 29, 1992.
International Search Report, PCT/GB2012/000374, dated Jul. 3, 2012, 3 pages.
Written Opinion, PCT/GB2012/000374, dated Jul. 3, 2012, 6 pages.
Great Britain Search Report, Application No. 1106960.6, dated Jul. 22, 2011, 2 pages.
Abstract of JP2007296415; Nov. 15, 2007.
Abstract of JP2009172603; Aug. 6, 2009.

* cited by examiner

TREATMENT OF WASTE

REFERENCE TO RELATED APPLICATIONS

This application is a U.S. national stage application of International Patent Application No. PCT/GB2012/000374, filed Apr. 24, 2012 Apr. 23, 2012, and claims the benefit of priority of Great Britain Application No. 1106960.6, filed Apr. 21, 2011, the entire disclosures of which are incorporated herein by reference.

The present invention relates to a method for the treatment of wastes containing hazardous organic components, for example, persistent organic pollutants (POPs) like polychlorinated biphenyls (PCBs) and tri-butyl tin oxide (TBT). The method provides for the remediation of the wastes and the destruction of the hazardous organic components and uses plasma treatment to achieve this.

An example of hazardous organic compounds that can be treated by the method of the present invention is polychlorinated biphenyls (PCBs). PCBs are a class of organic compounds with 1 to 10 chlorine atoms attached to biphenyl and are odourless, tasteless, clear to pale-yellow, viscous liquids. The chemical formula for PCBs is $C_{12}H_{10-x}Cl_x$, where x=1-10.

PCBs are widely used as dielectric fluids in electrical capacitors and transformers; and used as plasticisers and coolants. Smaller but still significant amounts of PCBs are used as lubricants, hydraulic fluids, heat transfer fluids, fire retardants, cutting oils, extenders in waxes, pesticides, inks, and in carbon-less copy paper. Accordingly, PCBs are often present in waste and waste materials.

PCBs are very stable compounds and do not degrade readily. A range of techniques have been used to destroy PCBs. These include high temperature incineration using commercial hazardous-waste units. The current regulations for such techniques require that the PCBs are burnt at a temperature of 1100° C. and gas phase residence time should be at least two seconds. Excess oxygen is required to prevent the formation of undesirable by-products. This technique is not suitable for the treatment of bulk soils and it is found to produce an off-gas with high levels of contamination in the fly ash or dust.

An alternative technique of co-processing in cement kilns is also known. A cement plant is a high temperature incinerator with: (1) temperatures in the flame of 1,450-2,000° C.; (2) gas phase temperature of 1,350-1,450° C.; (3) gas residence time in the kiln of more than 6 seconds; and (4) an oxidising atmosphere. These conditions make it possible to co-process PCB contaminated soil with cement in the kiln. This process is only suitable for the disposal of low concentrations of the PCBs, however, otherwise the destruction levels are unacceptably low.

It is known to use ultrasound to destroy PCBs. In this process, high power ultrasonic waves are applied to water, generating cavitation bubbles. These then implode or fragment, creating micro-regions of extreme pressures and temperatures where the PCBs are destroyed. The water is thought to undergo thermolysis, oxidizing the PCBs to CO, $CO_2$ and hydrocarbons such as biphenyl, and releasing chlorine. This method is only suitable for those congeners which are the most water soluble; those isomers with the least chlorine substitution. Additionally, this method also requires a source of metallic sodium to avoid the reformation of pollutants.

Thermo-chemical processes involving mixing the contaminated material with proprietary flux materials and then heating the waste in a rotary hearth furnace are also known. The process is similar to vitrification but does not involve complete melting. Instead, the process results in sintering of the material after significant material addition to form low melting point phases. This sintering process is robust and effective on a wide variety of waste types and contaminants and the products are described as clinker. This treatment can result in permanent destruction of organic materials including PCBs. However, if the contaminated material is sintered rather than vitrified, it may not form an inert material, which may then cause leachate problems if the final product is then land-filled.

An alternative treatment method is microbial degradation. Generally, the organisms used work in one of two ways: either they use the PCB as a carbon source, or destruction takes place through reductive dechlorination, with the replacement of chlorine with hydrogen on the biphenyl skeleton. However, the microbes tend to be highly selective in their dechlorination, with lower chlorinated biphenyls being readily transformed, and with preference to dechlorination in the para and meta positions. Secondly, microbial dechlorination tends to be rather slow acting on PCB as a soil contaminant in comparison to other methods. Thirdly, while microbes work well in laboratory conditions, there are often problems in transferring a successful laboratory strain to a real system. This is because the microbes can access other sources of carbon, which they decompose in preference to PCBs. Finally, the operation costs of this method are very high, and this approach is not suitable for high concentration PCBs.

Several chemical techniques are available. These include gas phase chemical reduction (GPCR). At 850° C. (or higher), PCBs, which have been washed and autoclaved from contaminated materials, are vaporised and then reacted with $H_2$/steam, which is known as steam reforming/water shift reaction. Alternatively, alkali metals (typically metallic sodium) can be used to react with PCBs in a hydrophobic liquid, to completely extract the chlorine in PCBs. These techniques require the waste to be in a specific form and the processing costs are high.

Accordingly, there is a desire for a process that will overcome, or at least mitigate, some or all of the problems associated with the methods of the prior art or at least a useful or optimized alternative.

According to a first aspect, the present invention provides a method for the treatment of waste comprising one or more hazardous organic components, the method comprising plasma treating a waste in a plasma treatment unit;
  wherein the waste comprises:
    (i) a soil and/or aggregate material; and
    (ii) an oil component; and
  wherein, before plasma treating the waste, the waste comprises one or more hazardous organic components and from 5 to 50% water by weight of the waste.

The present disclosure will now be further described. In the following passages different aspects of the disclosure are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Plasma technology can be used to convert many complex organic compounds (e.g. PCBs) into simpler, more easily treatable molecules such as carbon dioxide ($CO_2$), water ($H_2O$) and hydrochloric acid (HCl). The present inventors have discovered and refined a technique for the remediation of soils and/or aggregate materials that allows for the destruction of hazardous organic components.

According to the method of the present invention, the particular waste is treated by a high-energy electrical discharge within a plasma furnace. This results in extremely high temperatures and photo catalytic light with spectral peaks in the ultraviolet region at the high intensity levels that are attained using a plasma arc. Under these conditions any organic chemical substances are rapidly dissociated.

Advantageously, the presence of the oil component provides a combustible component that has a heating effect and reduces the energy usage involved in heating the waste component. Preferably the oil component is a waste oil component such as spent lubricant or crude oil residues and, accordingly, the additional technique provides a useful way of treating this undesirable waste. The oil component preferably comprises from 1 to 20 wt % of the waste, more preferably from 2 to 15 wt % and most preferably from 5 to 10 wt %.

The term "plasma treating" used herein refers to a method of applying plasma to a material. A plasma is an electrically neutral, highly ionised gas composed of ions, electrons and neutral particles and is distinct from other forms of matter. The term "plasma treatment unit" refers to any unit in which plasma is applied to a material, such as a plasma furnace. In a plasma furnace, electricity is passed between two or more electrodes spaced apart creating an electrical arc. The plasma may preferably be produced in a plasma torch and/or electrode which allows for targeted plasma treatment. Gases, typically inert gases, under high pressure are passed through the arc and are turned into plasma. Plasma is a clean, functional heat source with strong environmental characteristics. It is also very efficient in destroying Persistent Organic Pollutants (POPs). The plasma treatment unit is preferably a plasma furnace.

A typical plasma treatment unit for use in the present invention comprises a furnace and a graphite electrode system comprising one or more graphite electrodes to generate a plasma arc inside the furnace. Such plasma treatment units are discussed in, for example, WO2007000607, which is incorporated herein by reference. During operation the waste is fed into the furnace, typically through an inlet port. A plasma arc then transfers from the tip of the graphite electrode to the waste. Typically the return electrical path is via an electrically conductive path built into a furnace sidewall or hearth. Preferably this will be via conductive refractories and/or interconnecting metal-encased bricks to ensure an electrical circuit and thermal insulation. Periodically this will need to be replenished to ensure good hearth electrical contact as it can become depleted through slow consumption processes like reaction with chlorine.

Preferably the plasma treatment unit is a transferred-arc plasma treatment unit as described above. Preferably the plasma treatment unit is provided with a stabilising gas flow. The plasma treatment unit has one or more first electrodes, preferably graphite electrodes, arranged in the reaction chamber above the base of the reaction vessel. One or more second electrodes are provided in contact with the base of the reaction vessel. The arc transfers from the first electrode to the second electrode so that the plasma arc is transferred through the material to be processed. This causes efficient heating of the material. Preferably, at least a portion of the base of the reaction vessel is electrically conductive and is in electrical contact with the second electrode. The reaction vessel is preferably maintained under a controlled atmosphere so that off-gas can pass to an off-gas system and there is no loss of the hazardous organic material into the atmosphere.

The above-described transferred arc is advantageous compared to submerged arc furnaces. In a submerged arc furnace (SAF) two or more electrodes are placed within, or in contact with the material to be heated so that the arc travels between the electrodes and through the material. This leads to exaggerated electrode wear and can cause uncontrolled boiling of water within the material (as all of the heating is below the surface) and an unacceptable explosion risk as the balance of the material fuses limiting routes for degassing processes. Given the hazardous nature of the waste, it is also desirable to minimize the loss of harmful species to the off-gas systems that can occur with this configuration of electrodes.

The above-described transferred arc is also advantageous compared to non-transferred arc plasma torches. The use of a plasma torch is less efficient for heating the material and tends to provide only localized heating. Plasma torches that rely on the feed of the material through the torch are also impractical; a soil injected through the torch would lead to blocking, requiring either excessive pre-grinding of the material or an overly wide torch configuration.

Preferably the plasma treatment is carried out in the presence of a plasma stabilising gas. Preferably the plasma stabilising gas is selected from one or more of nitrogen, argon, helium and steam.

The term "off-gas" as used herein refers to the gaseous product that leaves the plasma treatment unit when carrying out plasma treatment of a material.

The term "slag" refers to the vitreous residue produced in the plasma furnace of the plasma treatment unit. It is formed as a result of the plasma treatment of the waste material. The term "molten slag" used herein refers to a slag that is solid at room temperature but molten at the operating temperature of the plasma treatment unit.

Preferably the method is carried out continuously. In this case, the waste is treated in a continuous process and the waste forms a waste stream. The slag can then be recovered from the furnace and the waste feedstock fed into the plasma treatment unit continuously. The off-gas can be captured and treated continuously as well.

In an alternative embodiment, the process can be carried out batchwise. In this case, the waste is loaded into the plasma treatment unit and plasma treated. The off-gas can be treated as it is produced, though the slag is tapped off only after the plasma treatment is complete.

A "waste" as defined herein includes any suitable material feedstock that is no longer desired in its current form. For example, the waste may include polluted soils that need to be remediated in view of the presence of hazardous material therein. Further examples are provided herein.

The waste may be provided as a single composite feedstock before being introduced into the plasma treatment unit. It is then easier to ensure that the feedstock actually being plasma treated has a consistent composition and characteristics. Alternatively, the components of the waste can all be fed separately, preferably simultaneously, into the plasma furnace so as to achieve a substantially constant mixture present in the furnace. Introducing components separately allows for ease of pumping and loading of components having different properties, such as aggregate (solid, screw-fed) and oil (liquid, pumped). However, some sources of waste, such as, harbour dredgings may already contain the required components in substantially the desired proportions.

The waste may vary in composition and homogenization of the waste, while desirable, is not essential. PCB contaminated waste, for example, is often very heterogeneous (free flowing liquids to solids). The balance of feed and oxidant can be controlled by online process measurements and metering devices which can be used to handle the varying properties of the waste being treated.

Preferably the waste is "substantially homogeneous". That is, the waste feedstock has one or more properties which do not vary to a great extent throughout the bulk of the waste or from batch to batch. Hence the value of the property in question does not vary to a great extent as the waste is fed to the plasma treatment unit. Such properties that preferably do not vary to a great extent include the calorific value, the size of constituents, moisture content, ash content, and density of the waste material. Preferably one or more of these properties varies by 20% or less, preferably 15% or less, more preferably 10% or less. Preferably, the calorific value and the moisture content of the waste being fed to the plasma treatment unit are relatively consistent during the process. Preferably the waste is homogeneous in so far as is possible given the waste components.

Techniques for ensuring the homogeneity of the waste include, for example: microbial digestion, picking, shredding, drying, screening, mixing and blending. These techniques are well known in the art.

The waste comprises a soil and/or aggregate material. Soils are well known in the art and are used to refer to various forms of earth including sands, muds, peat, clays and the like. Aggregate includes man-made building waste, including concretes and cements, and also natural aggregates including all minerals, such as rocks, stones, gravel and the like. The soil and/or aggregate material will preferably constitute at least 40 wt % of the waste, more preferably at least 50 wt % and most preferably at least 60 wt %.

The oil component includes any non-polar high carbon- and hydrogen-content substance or waste contaminated therewith. Preferably the oil is any oleophatic material that is a solid or liquid at room temperature and pressure. Preferably the oil component is a waste oil component. The oil component is preferably in fluid form and is preferably essential oil or a blend of oils. Preferred oils include crude oil, diesel fuel, fuel oils and lubricants, and mixtures thereof. Particularly preferred are heavier fractions from crude oil. The oils can, advantageously, include hazardous organic components, although the use of pure or blended uncontaminated oils is also contemplated. The use of the oil reduces the energy costs of the processing technique. However, the use of oil is relatively expensive and the amount used must be controlled.

In one embodiment, the oil component may be replaced with an organic component. The organic component comprises any organic matter including biomass and plant derived material. The material may also include municipal waste and the like. The organic component may further comprise an oil component as described herein.

Preferably the hazardous organic component treated in the present invention comprises persistent organic pollutants (POPs), ozone depleting substances (ODSs) and persistent, bioaccumulative and/or toxic (PBT) pollutants. In particular, the method is preferably used for the treatment of waste comprising persistent organic pollutants (POPs) and, in particular polychlorinated biphenyls (PCBs).

Preferably from 5 to 50% by weight of the total waste is water (i.e. including the water). More preferably from 10 to 40% by weight of the waste is water and most preferably from 15 to 25%. This provides a source of oxidant for the plasma treatment process. In addition, the use of a moist waste avoids the requirement for any pre-drying step and avoids the formation of hazardous dusts before treatment is performed. If the water level is too high then screening can be used to reduce the water content, this avoids wasting energy treating an excessive amount of water. Rapid and suitable dewatering techniques are well known in the art. Alternatively, if the water level is too low then water can be added.

This process is suitable for various contaminated wastes, including slurries, powders and the like with any concentration of contaminants. Whereas other treatment processes cannot handle the presence of such high levels of water (such as the explosion risk presented with SAFs) or cannot handle the feeding requirements presented by aggregates (for plasma torches in particular), the present process is able to handle waste with a wide range of properties.

Preferably, if required, the method comprises a step of blending (i) the soil and/or aggregate material, and (ii) the oil component to provide the waste, preferably to provide a waste stream. Alternatively, premixed blends or waste that already comprises the components (such as particular landfill wastes) can be used. PCB contaminated wastes typically are a mixture of soil, aggregate, water, oil and PCBs.

Preferably the waste provided before treatment comprises the one or more hazardous organic components. Preferably the waste is provided as a single stream comprising the soil and/or aggregate material, the oil component and the one or more hazardous organic components. Alternatively, the two or more streams of waste may be provided, preferably each having the one or more hazardous organic components.

Preferably, before plasma treatment, one or more hazardous organic components are contained in:
 (i) the soil and/or aggregate material; and/or
 (ii) the oil component; and/or
 (iii) the waste stream.

For example, the soil or the oil may be contaminated with PCBs. Alternatively, a further component contaminated with a hazardous organic component may be introduced into the waste stream.

Legislative requirements prohibit the mixing of contaminated waste with non-contaminated waste unless all the generated products are less hazardous than the starting materials. However, in strictly technical terms, it is envisaged that before plasma treating the waste the method could comprise a step of blending one or more hazardous organic components into:
 (i) the soil and/or aggregate material; or
 (ii) the oil component; or
 (iii) the waste stream.

In this way, heavily contaminated wastes can be mixed with lightly or uncontaminated wastes to prepare the waste before processing. When the process is used to remediate soil, the soil and or aggregate will generally already contain the one or more hazardous organic components.

Preferably the plasma treatment is carried out in the presence of an oxidant in addition to the water present in the waste. Preferably the oxidant comprises steam and/or oxygen. Preferably the oxidant comprises oxygen gas, and wherein the oxygen gas is added in an amount of from 20 to 40% by weight of the total weight of the waste, more preferably 25 to 35%. For example, if 1000 kg of the waste were to be treated, 250 to 350 kg of oxidant (preferably oxygen) should be added. The presence of this relatively large amount of oxygen relative to the waste promotes the complete destruction of the hazardous organic components. In contrast to the pyrolysis/gasification processing conditions of some prior art treatment processes, the presence of these levels of oxidant facilitates the complete decomposition of the hazardous organic components of the waste.

Preferably the plasma treatment of the waste is carried out at a temperature of at least 1100° C. Preferably the plasma treatment of the waste is carried out at a temperature of from 1100° C. to 1800° C., more preferably at from 1200° C. to 1600° C. The high temperature promotes the complete destruction of the hazardous organic components while balancing the energy costs required.

Preferably the method comprises a step of adding of one or more glass-forming components, in particular, $SiO_2$, CaO and $Al_2O_3$ to the waste before treatment. These materials can alternatively be added to the soil and/or aggregate material before treatment, especially where the oil component is only added to the soil and/or aggregate material in the plasma furnace. These glass-forming materials, which may be added in the form of compounds such as borosilicate or soda-lime, are support the development of a matrix to entrap the inorganic contaminants. Heterogeneous contaminated materials, such as sludges or soil, can be vitrified as well, but presence of the additives helps. The vitrified material, when tested, passed leachate based environmental impact tests and is chemically and physically stable.

Preferably the $SiO_2$:CaO:$Al_2O_3$ are added to provide a ratio of $SiO_2$:CaO:$Al_2O_3$ in the waste of: from 50 to 70% by weight $SiO_2$; from 20 to 30% by weight CaO; and from 10 to 20% by weight $Al_2O_3$. This ratio is based on the total of the added material and the corresponding materials already present in the soil and/or aggregate material. Preferably the ratio of $SiO_2$:CaO:$Al_2O_3$ in the waste is: from 60 to 65% by weight $SiO_2$ and most preferably about 63%; from 12 to 14% by weight CaO and most preferably about 13%; and from 23 to 26% by weight $Al_2O_3$ and most preferably about 24%. The ratio of these compounds has been found to result in the low temperature formation of a stable phase having a liquidus temperature of around 1170° C. Thus, a stable vitrified product can be formed easily within the process capabilities of the plasma treatment system and exceeding the minimum treatment requirements mandated for incineration of PCBs.

$SiO_2$, CaO and $Al_2O_3$ are the primary inorganic components of soil and aggregate materials, although the $SiO_2$ content often dominates compositions. Therefore, it is desirable to add CaO and $Al_2O_3$ to "drive" the slag composition to the foregoing preferable point where the melting point is lower, i.e. only 1170° C. and the topography of the phase diagram is relatively flat, i.e. minor changes in system chemistry will not have profound effects of the system's characteristics.

Typically the step of plasma treatment produces a molten slag. Any non-volatile hazardous inorganic materials, such as heavy metals or compounds thereof, are typically incorporated into the molten slag, producing an inert vitreous or semi-crystalline product, dependent on the cooling rate and the composition. The process can be tweaked so that the inert vitreous or semi-crystalline product conforms to local product qualifications.

Preferably the method comprises retrieving a solid vitrified slag and/or an off-gas. The off-gas may contain calorific components and can be used for energy generation in a gas turbine or by combustion. In any event, the off-gas is desirably treated to ensure that no residual hazardous components are exhausted. The solid vitrified material can be land-filled or used as a building material.

Preferably the molten slag is continuously removed from the plasma treatment unit. Typically, the molten slag is continuously removed at a dedicated channel. This encourages positive plug flow movement of molten slag without the associated build up of process gases. A build up of process gases within the plasma treatment unit could be hazardous. Preferably, the removed molten slag is cooled to form a solid vitrified material. This results in inorganic materials contained in the slag being trapped within the glass matrix. Typically, the solid vitrified material exhibits a composition and leachability of metals below the UK's inert waste landfill WAC (Waste Acceptance Criteria) leaching limits. This means that the solid vitrified material can be disposed of in landfill or more preferably qualified as a product in line with the requirements of the European Waste Framework Directive (Directive 2008/98/EC).

The invention will now be discussed further with reference to the figures, provided purely by way of example, in which.

Figure 1:
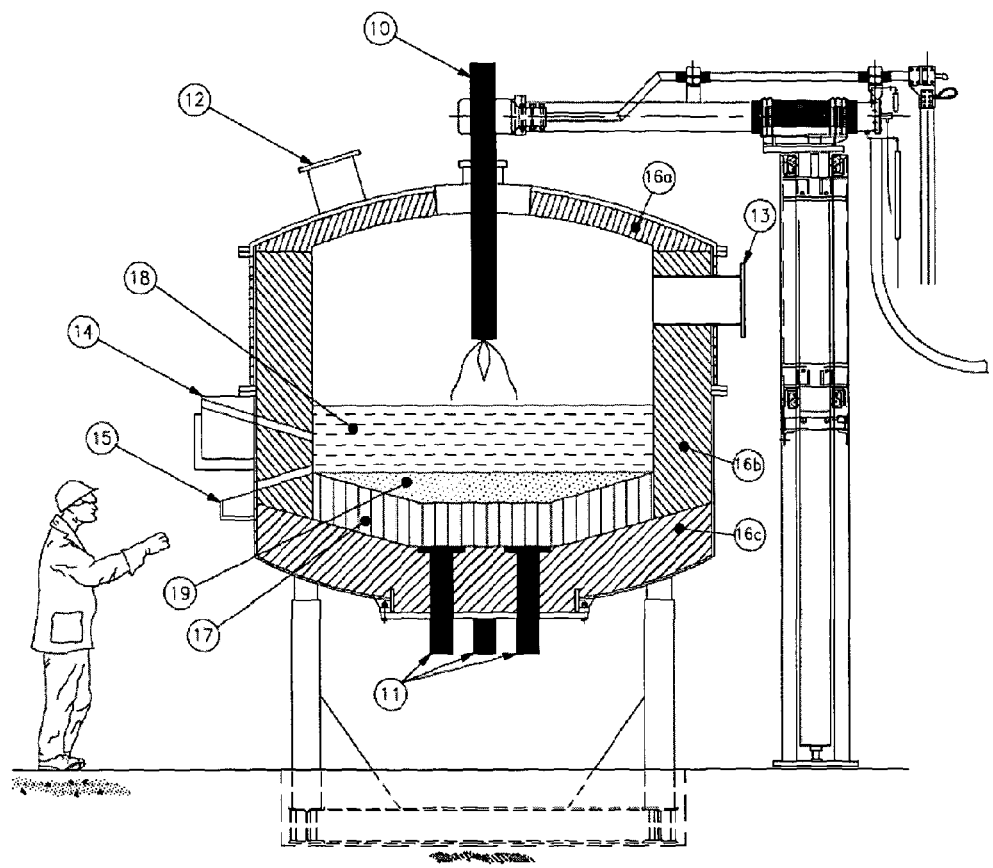
FIG. 1 shows a schematic of the furnace chamber that can be used in the present invention.

A consistent numbering scheme has been adopted in the figures, wherein the numbers correspond to the following components:

1 Feed—waste containing hazardous organic component (in the examples, waste simulant used for the trials: 1,4 dichlorobenzene, topsoil, aggregate, quicklime, bauxite)
2 Water
3 Waste oil (Engine oil used for the R&D trials)
4 Inert gas (Nitrogen or Argon)
5 Oxidant (oxygen)
6 Plasma/inert gas (Nitrogen or Argon)
10 Primary electrode
11 Secondary electrode or electrodes
12 Feed port
13 Offgas duct
14 Main tap-hole (continuous overflow spout)
15 Secondary tap-hole
16a Refractory type 1
16b Refractory type 2
16c Refractory type 3
17 Thermally insulating electrically conducting hearth
18 Slag
19 Retained metal heel
20 Oxidizer
21 Natural gas inlet/dosing
22 Air inlet/dosing
23 Water inlet/dosing
24 Off gas cooling column (spray cooling tower)
25 Heat exchanger
26 Sorbent dosing system
27 Dosing/transporting air inlet
28 Bag house
29 Air pollution control residue
30 HEPA (high efficiency particulate air) filter
31 ID fan
32 Exhaust stack
40 cooling water
45 Roof of the furnace
50 Inlet of the furnace The invention will now be described with reference to a non-limiting example. It is noted that as the chemical structure of 1,4-Dichlorobenzene ($C_6H_4Cl_2$) is similar to PCB's, this was used as a stimulant to avoid unnecessary operator content with real PCBs. 1,4-Dichlorobenzene is accepted throughout the literature as a stimulant.

The plasma furnace used in the trial consisted of the following sections.

A refractory-lined mild steel shell with an additional water cooling jacket in the upper shell area and a row of water cooled copper fingers at a nominal slag level in order to provide additional protection for the refractories at the slag line. The refractory is a cast alumina material, which contains >90% alumina and has a maximum service temperature limit of 1800° C. The furnace also has a 50 mm diameter horizontal tapping hole (100 mm above the furnace base in the centre of a tapping hole block). A 150 mm diameter steel bar in the base of the furnace acts as a return electrode for single electrode operation. The furnace has apertures in the upper shell region for pressure monitoring and for camera viewing. Thermocouple monitoring of refractory temperature are provided at 8 locations (K-type thermocouples) and in the return electrode at 2 locations (K-type).

A conical refractory-lined mild steel roof with a water cooling jacket. The refractory is approximately 75 to 150 mm thick. There are 5 large apertures: a central port for single electrode work, four side ports for feeding and general access etc and a larger off-gas port. There is also a smaller camera port housing a small remote video camera in a protective case which allows for excellent viewing of the inside of the furnace. There are also 2 thermocouple holes for refractory temperature monitoring as above. The roof also provides location points for electrode manipulators and for the off gas ducting, which is connected with the thermal oxidiser, cooling tower, baghouse filter, high efficiency particulate air (HEPA) filters, induced draft (ID) fan, wet scrubber, stack etc.

A steel support stand mounted on heavy-duty wheels and railway tracks for easy removal and installation of the furnace.

Before starting the feeder, the plasma furnace needs to be pre-heated by the plasma electrode for about 3-4 hours, to ensure that the inner wall (high-temperature alumina refractory material) are hot enough, e.g. 900-1100° C. These temperatures can be estimated from the readings of thermocouples installed in the roof, shell, and bottom of the furnace. A camera, cooled by an argon gas purge, is installed to monitor the condition inside the feeding, plasma power is adjusted to match the feed rate, see Table 9. Temperatures in the furnace rise gradually until the melt pool is at 1400-1600° C.; at this point the heat input is matched by the heat loss to the cooling water and other losses, i.e. steady state conditions have been achieved as the temperatures plateau. (For commercial plant which has slag-overflow system, once the slag level reaches the desired height, e.g. 50 mm above the overflow port, the furnace is ready to be lanced to allow the molten slag to overflow continuously from the overflow port into a slag bin, which is changed periodically).

The off-gas leaving the plasma furnace is a mixture of argon, $N_2$, $NO_x$, $CO$, $CO_2$, $O_2$, $HCl$ and particulates at temperatures of 900-1200° C. This mixture is combusted in the thermal oxidiser at above 1100° C. for two seconds gas phase residence time.

After the combustion stage, the gases are cooled to 300-400° C. by passing a spraying cooling system and a heat exchanger. At this temperature, hydrated lime powder is injected to the off-gas stream to react with HCl gas, if necessary. The carry-over particulates and any excess lime are separated in the off-gas bag house filter and collected in a drum. Particulate-free off-gas is further cleaned by high-efficiency particulate absorbing (HEPA) filters and wet scrubber then monitored by CEMS before being emitted to atmosphere via a stack.

Figure 2:
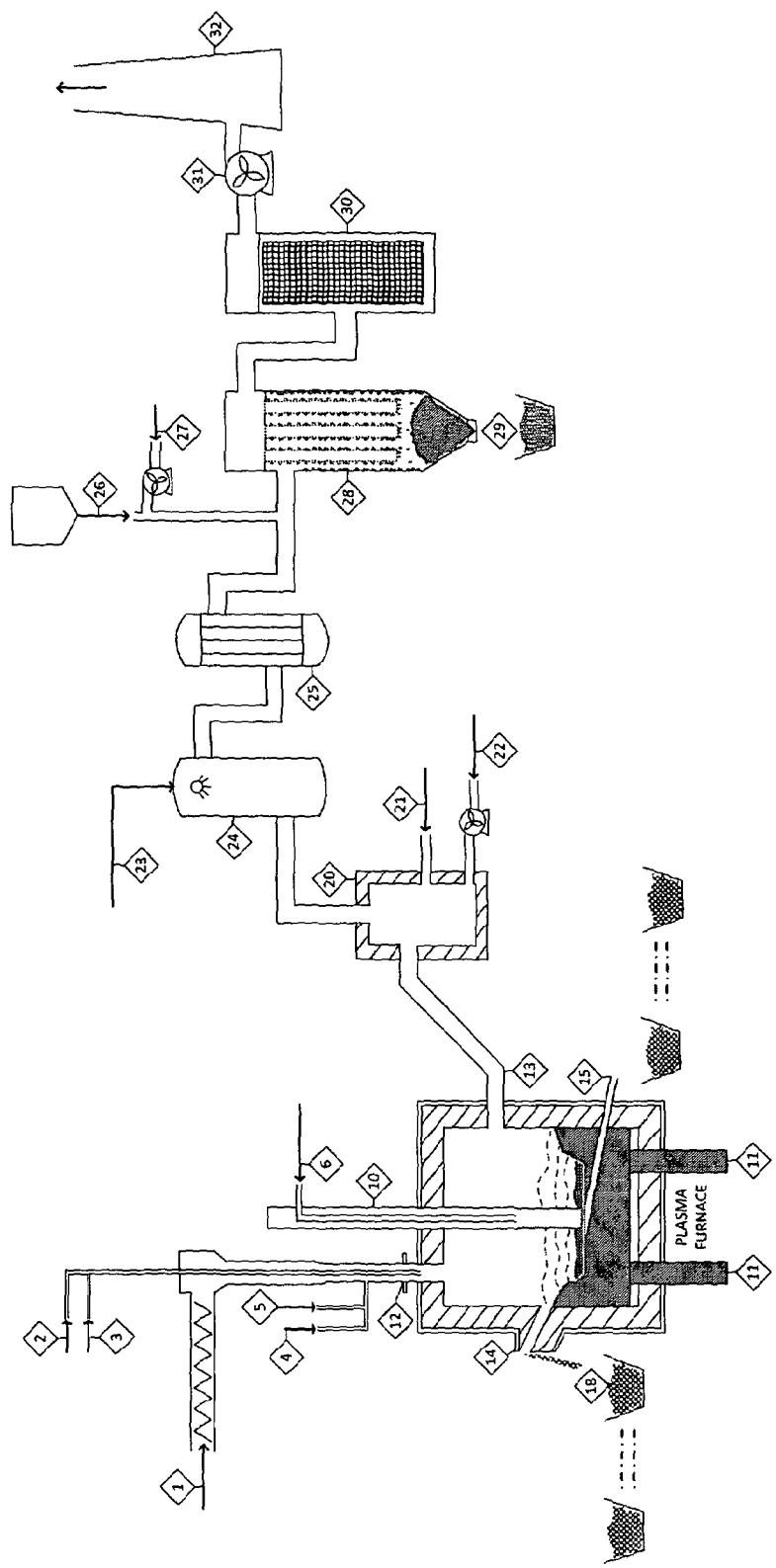
FIG. 2 is a full schematic showing a configuration of the infrastructure that can be used in the present invention.
Figure 3:
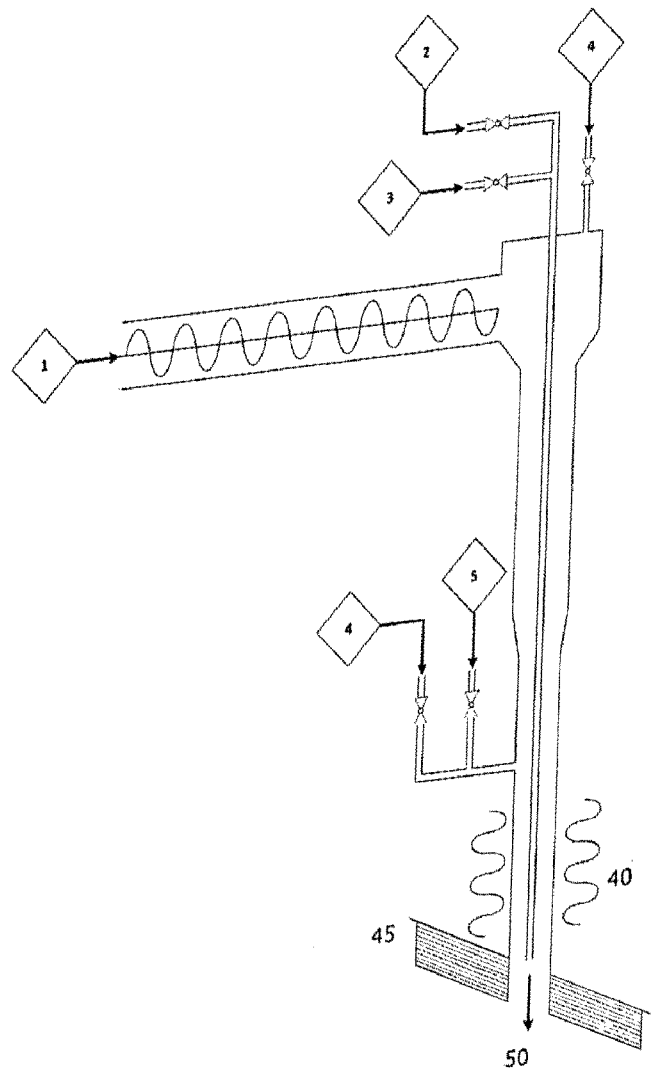
FIG. 3 is a schematic of the feeding system for this system.

The feeding system was modified to allow all the three streams (solid, water and engine oil) to be fed into the furnace simultaneously, with minimum cross-effects on their flowrates. Preferably the three components meet just before being introduced into the furnace to form a continuous waste stream. Alternatively, separate feeds can be used to form the waste stream in the furnace. Argon was introduced to the feeding pipe as well, to cool down the water/engine oil feeding pipe during the furnace warming-up and cooling-down periods, and to force the solid mixture to move forward to the furnace. Oxygen was fed into the furnace by joining in one of argon pipe. FIG. 2 is a simplified schematic of the modified feeding system.

For each trial, the furnace was heated from room temperature to approximately 1200° C. before starting to feed. This took about 3 to 4 hours. The heat added to the furnace was imparted on the refractory material and the shell resulting in increases in thermal mass and temperature. The mode of heat transfer was dynamic in that a part of the heat added was removed by cooling water. When the furnace losses to water-cooled elements reached about 80 kW and stabilised, it meant that the furnace was in quasi-steady state. Starting to feed materials from steady state, ensured that the materials were melted quickly, and therefore avoided the formation of "cold wall" or "feed pile"; this was considered to be more representative of continuous processing conditions.

During feeding, the feed rates were maintained as constant as possible, and the formulation of simulated wastes. The slag level within the furnace would increase because of continuous feeding; however, the plasma arc length was adjusted to be in the range of 100 to 200 mm. Consequently the voltage of the plasma changed from 160 to 250 volt. By changing the set-point of the plasma current, the plasma power was easily controlled to match the feed-rate of the simulants, i.e. 110 to 130 kW for processing 40 kg/h simulated wastes.

After delivering all the feed required for each trial (typically 130 to 200 kg), the slag level reached the desired height, e.g. 200 to 300 mm. Following feeding the charge was soaked for about 20 minutes (equivalent to normal steady state residence time) to allow all materials fed into the furnace to melt and be treated, while plasma power was maintained at 90 to 110 kW (to compensate the heat loss from the plasma furnace to all elements of the plasma furnace, i.e. including non water-cooled parts).

Then the team prepared to lance the tap hole of the furnace, in order to tap the slag out to a tray.

When the tapped lava-like slag naturally cooled down in the tray, it formed a dense slag monolith. After mechanical fracture, the size could be reduced to less than 150 mm. This slag was vitreous and dense and, subject to qualification, could be considered as an inert waste for the purposes of disposal and/or re-use, and hence could be used in construction or for road surfacing material.

The components and their fractions in the simulants were as follows, see Table 1 (unit: wt/wt).

TABLE 1

| Components of PCB waste simulants | |
|---|---|
| Components | Fractions |
| 1,4-Dichlorobenzene ($C_6H_4Cl_2$) | 0.1-1.2% |
| Comma 15W-40 Super Mineral Engine | 7.5% |
| Water | 12.5% |
| Topsoil | 50.0% |
| Aggregate | Balance |
| Total | 100.0% |

For the topsoil, the average values of the main components were obtained from literature, see Table 2 (unit: wt/wt).

TABLE 2

| A typical composition for top soil | | | | | | | | |
|---|---|---|---|---|---|---|---|---|
| Organi | $SiO_2$ | $Al_2O_3$ | $Fe_2O_3$ | CaO | MgO | $K_2O$ | $Na_2O$ | Total |
| 7.68% | 66.60 | 12.91 | 3.48% | 3.28% | 1.84% | 2.56% | 1.64% | 100.00 |

From the literature, organics in topsoil can be represented by $C_9H_{11}NO_3$.

The components of aggregate are based on the following two assumptions:

Assumption 1:

Aggregate is made from cement, sand and stone only, and their fractions are as follows, see Table 3 (unit: wt/wt).

TABLE 3

The assumption of the components in aggregate

| | Materials in aggregate | | | |
|---|---|---|---|---|
| | Cement | Sand | Stone | Total |
| Fractions | 19% | 31% | 50% | 100% |

Assumption 2:

The components in cement, sand and stone are as follows, see Table 4 (unit: wt/wt).

TABLE 4

Components in cement, sand and stone

| Materials in aggregate | Organics | $SiO_2$ | $Al_2O_3$ | $Fe_2O_3$ | CaO | MgO | $K_2O$ | $Na_2O$ | Total |
|---|---|---|---|---|---|---|---|---|---|
| Cement | 0.00% | 22.45% | 5.10% | 4.08% | 64.29% | 2.04% | 1.02% | 1.02% | 100.00% |
| Sand | 0.00% | 100% | 0% | 0% | 0% | 0% | 0% | 0% | 100% |
| Stone | 0.00% | 30% | 0% | 0% | 50% | 20% | 0% | 0% | 100% |

By combining the figures in Table 3 and Table 4, the fractions of the components in the solid aggregate mixture can be calculated and the results are shown in Table 5 (unit: wt/wt).

TABLE 5

Calculated fractions of the components in aggregate

| Materials | Organics | $SiO_2$ | $Al_2O_3$ | $Fe_2O_3$ | CaO | MgO | $K_2O$ | $Na_2O$ | Total |
|---|---|---|---|---|---|---|---|---|---|
| Aggregate | 0.00% | 50.56% | 0.96% | 0.76% | 36.98% | 10.36% | 0.19% | 0.19% | 100.00% |

Assuming the concentration of 1,4-Dichlorobenzene is 1.00%, the final composition of the simulant waste can be obtained by combining the data in Tables 1, 2 and 5. The results are shown in Table 6 (unit: wt/wt). These results were used as the basis of process calculation in this report.

TABLE 6

Final compositions in a simulant waste

| Components | Fractions |
|---|---|
| $C_6H_4Cl_2$ | 1.00% |
| $C_{12}H_{26}$ | 7.50% |
| $H_2O$ | 12.50% |
| $C_9H_{11}NO_3$ | 3.84% |
| $SiO_2$ | 47.96% |
| $Al_2O_3$ | 6.73% |
| $Fe_2O_3$ | 1.96% |
| CaO | 12.36% |
| MgO | 3.93% |
| $K_2O$ | 1.34% |
| $Na_2O$ | 0.88% |
| Total | 100.00% |

In order to achieve the beneficial effects of the balance of $SiO_2$, CaO and $Al_2O_3$, the amount of flux materials were "back-calculated". The components of final blended feed are shown in the last column of Table 7. Note this is based on the assumption that the concentration of 1,4-Dichlorobenzene in raw simulant waste is 1.00%. The fractions of the raw simulant waste and the blended materials are shown in Table 8.

TABLE 7

Comparisons of raw simulant waste and blended feeding materials

| Components | In raw simulant waste (wt/wt) | "Top three" In raw simulant waste (wt/wt) | Final "top three" after adding flux materials (wt/wt) | Finally in the blended materials (wt/wt) |
|---|---|---|---|---|
| $C_6H_4Cl_2$ | 1.00% | | | 0.91% |
| $C_{12}H_{26}$ | 7.50% | | | 6.84% |

TABLE 7-continued

Comparisons of raw simulant waste and blended feeding materials

| Components | In raw simulant waste (wt/wt) | "Top three" In raw simulant waste (wt/wt) | Final "top three" after adding flux materials (wt/wt) | Finally in the blended materials (wt/wt) |
|---|---|---|---|---|
| $H_2O$ | 12.50% | | | 11.40% |
| $C_9H_{11}NO_3$ | 3.84% | | | 3.51% |
| $SiO_2$ | 47.96% | 71.52% | 62.56% | 43.76% |
| $Al_2O_3$ | 6.73% | 10.04% | 13.20% | 9.23% |
| $Fe_2O_3$ | 1.96% | | | 1.79% |
| CaO | 12.36% | 18.44% | 24.24% | 16.96% |
| MgO | 3.93% | | | 3.58% |
| $K_2O$ | 1.34% | | | 1.22% |
| $Na_2O$ | 0.88% | | | 0.80% |
| Total | 100.00% | 100.00% | 100.00% | 100.00% |

TABLE 8

The fractions of the seven streams in a simulant waste

| Streams | Fractions |
| --- | --- |
| 1,4-dichlorobenzene | 0.91% (variable) |
| Engine oil | 6.84% |
| Water | 11.40% |
| Dry topsoil (<5 mm) | 45.62% |
| Dry aggregate (<5 mm) | 26.46% (variable) |
| Flux (quicklime CaO) | 5.68% |
| Flux (Bauxite $Al_2O_3$) | 3.09% |
| Total | 100.00% |

The concentration of 1,4-Dichlorobenzene used for the four trials may vary slightly, e.g. from 0.1 to 1.2% w/w (1,000 ppm-12,000 ppm) in simulant wastes. To balance this variation, we adjusted the concentration of aggregate accordingly while retaining the concentrations of all other streams, i.e. water, engine oil, topsoil and flux materials. Therefore, in Table 8, the fractions of 1,4-Dichlorobenzene and aggregate are marked as "variable".

Assuming the feed-rate of the simulant waste (its components are listed in Table 8) is 806 kg/h (i.e. commercial 6,000 tpy plant scale), oxygen (used as oxidant) flow-rate is 257 kg/h.

Oxygen flowrates were determined to be excessive in order to completely destroy the organic chemicals, e.g. engine oil and 1,4-Dichlorobenzene, and to reduce the electricity power requirement as much as possible. As a result of this, the unit melting energy required was only 0.22 kWh/kg, which was much lower than those of many other solid waste systems (typically 0.5 to 0.8 kWh/kg).

Table 9 lists the relevant figures.

TABLE 9

Calculated oxygen and electricity requirements

| | Feed-rate of simulants (kg/h) | | | | | |
| --- | --- | --- | --- | --- | --- | --- |
| | 25 | 30 | 35 | 40 | 45 | 50 |
| $O_2$ flow-rate (kg/h) | 7.97 | 9.56 | 11.15 | 12.74 | 14.34 | 15.93 |
| $O_2$ flow-rate (l/min) at NTP | 92.93 | 111.52 | 130.10 | 148.69 | 167.28 | 185.86 |
| Theoretical melting energy required (kWh/kg) | 0.22 | 0.22 | 0.22 | 0.22 | 0.22 | 0.22 |
| Melting power required (kW) | 5.57 | 6.68 | 7.80 | 8.91 | 10.03 | 11.14 |
| Hot-Wall Furnace heat loss (kW) | 80.00 | 80.00 | 80.00 | 80.00 | 80.00 | 80.00 |
| Plasma power required (kW) | 85.57 | 86.68 | 87.80 | 88.91 | 90.03 | 91.14 |

For operation safety and environmental protection reasons, the simulant wastes were stored in completely sealed drums and blended using a driven tumbling machine.

During operation, the furnace is designed to work under a slight negative pressure, i.e. −60 to −120 Pa, to avoid the release of fumes and the egress of off-gas, by the use of an induced draft fan. The off-gas is designed to be fully oxidised in a thermal oxidiser. The particulates in the off-gas are collected in a baghouse filter followed by a high efficiency particulate air (HEPA) filter before it is discharged into the atmosphere.

The only "waste" from the plant is the particulates collected from the Thermal Oxidiser and the Baghouse Filter. The main components in the particulates are NaCl and KCl, which can be used as road salt, subject to qualification.

The results of the trials are set out in the following table.

| | Trials No | | | |
| --- | --- | --- | --- | --- |
| | Trial 1 | Trial 2 | Trial 3 | Trial 4 |
| | Date | | | |
| | 17/11/2009 | 19/11/2009 | 01/12/2009 | 08/01/2010 |
| Formulation by fraction (w/w) | | | | |
| 1,4-dichlorobenzene | 0.100% | 0.912% | 0.200% | 1.200% |
| Engine oil | 6.84% | 6.84% | 6.84% | 6.84% |
| Water | 11.40% | 11.40% | 11.40% | 11.40% |
| Dry topsoil (<5 mm) | 45.62% | 45.62% | 45.62% | 45.62% |
| Dry aggregate (<5 mm) | 27.27% | 26.46% | 27.17% | 26.17% |
| Flux (quicklime CaO) | 5.68% | 5.68% | 5.68% | 5.68% |
| Flux (Bauxite $Al_2O_3$) | 3.09% | 3.09% | 3.09% | 3.09% |
| Total | 100.00% | 100.00% | 100.00% | 100.00% |

-continued

|  | Trials No | | | |
|---|---|---|---|---|
|  | Trial 1 | Trial 2 | Trial 3 | Trial 4 |
|  | Date | | | |
|  | 17/11/2009 | 19/11/2009 | 01/12/2009 | 08/01/2010 |
| Formulation by weight per 25-litre drum | | | | |
| 1,4-dichlorobenzene (kg) | 0.020 | 0.182 | 0.040 | 0.240 |
| Engine oil (kg) | 1.37 | 1.37 | 1.37 | 1.37 |
| Water (kg) | 2.28 | 2.28 | 2.28 | 2.28 |
| Dry topsoil (<5 mm) (kg) | 9.12 | 9.12 | 9.12 | 9.12 |
| Dry aggregate (<5 mm) (kg) | 5.45 | 5.29 | 5.43 | 5.23 |
| Flux (quicklime CaO) (kg) | 1.14 | 1.14 | 1.14 | 1.14 |
| Flux (Bauxite $Al_2O_3$) (kg) | 0.62 | 0.62 | 0.62 | 0.62 |
| Materials per drum including engine oil & water (kg) | 20.00 | 20.00 | 20.00 | 20.00 |
| Materials processed | | | | |
| No. of drums processed | 6.0 | 10.0 | 8.0 | 6.0 |
| Total solid materials processed in the trial (kg) | 98.10 | 163.51 | 130.80 | 98.10 |
| Process data | | | | |
| Pro-loaded carbon before the trial (kg) | 0.92 | 0.00 | 0.50 | 0.50 |
| Pro-loaded pig iron before the trial (kg) | 11.69 | 0.00 | 8.44 | 0.00 |
| Pro-loaded slag before the trial (kg) | 0.00 | 75.00 | 82.35 | 75.00 |
| Feeding time in the trial (hour) | 4.12 | 5.25 | 4.10 | 3.57 |
| Average feed-rate of solid in the trial (kg/h) | 23.83 | 31.14 | 31.90 | 27.51 |
| Average feed-rate of simulant in the trial (kg/h) | 30.21 | 38.34 | 38.86 | 34.34 |
| Actual water consumed in the trial (kg) | 19.35 | 26.51 | 20.71 | 18.01 |
| Actual engine oil consumed (kg) | 6.90 | 11.26 | 7.80 | 6.35 |
| Actual simulant (solid + engine oil + water) processed (kg) | 124.35 | 201.27 | 159.31 | 122.47 |
| Actual oxygen consumed in the trial (from MFC) (kg) | 49.40 | 67.05 | 52.36 | 45.55 |
| Average current when feeding (A) | 624 | 541 | 564 | 656 |
| Average voltage when feeding (V) | 173 | 185 | 193 | 160 |
| Average power when feeding (kW) | 108 | 100 | 109 | 105 |
| Heat loss when feeding (kW) | 77 | 77 | 77 | 77 |
| Unit energy for melting (actually in the trial) (kWh/kg) | 0.25 | 0.12 | 0.20 | 0.23 |
| Slag (predicted from HSC modeling) (kg) | 103.61 | 228.21 | 213.35 | 166.92 |
| Slag (generated approximately) (kg) | 89.02 | 155.00 | 180.00 | 178.00 |
| Particulates (predicted from HSC modeling) (kg) | 1.10 | 1.83 | 1.47 | 1.10 |
| Particulates (generated approximately) (kg) | 3.50 | 5.83 | 4.67 | 3.50 |
| Analysis results on 1,4-dichlorobenzene | | | | |
| In slag (µg/kg) | <5 | <5 | <5 | <5 |
| In particulates before combustion chamber (µg/kg) | N/A | 63 | N/A | 29 |
| In particulates after combustion chamber (µg/kg) | N/A | <5 | <5 | <5 |
| In off-gas before combustion chamber (mg/Nm3) | N/A | N/A | N/A | <8.12 |
| Destruction & removal efficiency (slag basis) | 99.99963% | 99.99996% | 99.99972% | 99.99994% |

The concentration of 1,4-dichlorobenzene in every slag sample was less than limit of detection (i.e. 5 µg/kg), which means the minimum destruction and removal efficiency (DRE) is 99.99963%.

DRE is calculated as the mass emission rate of the selected hydrocarbon divided by the mass input rate of this same hydrocarbon. The calculation of DRE is as follows (Trial 3 is used as an example):

Step 1: Calculate the concentration of 1,4-dichlorobenzene in simulants, which is defined as $C_{in}$ (unit: µg/kg).

$$C_{in} = \frac{\text{Mass of 1,4-dichlorobenzene in } \mu g}{\text{Mass of (Engine oil + Water + Solid Materials) in kg}} =$$

$$\frac{0.04 \times 8 \times 10^9}{7.80 + 20.71 + 130.80} = 2008664 \text{ µg/kg}$$

Step 2: Determine the concentration of 1,4-dichlorobenzene in slag, which is defined as $C_{out}$ (unit: µg/kg). As this concentration is in slag less than limit of detection (5 µg/kg), we choose 5 µg/kg as a safe margin, i.e.

$C_{out}$=5 µg/kg

Step 3: Define and calculate DRE

DRE×100%=[(0.04×8×10$^9$)−(5*180)]/[0.04×8×10$^9$]× 100%=99.99972%

The concentrations of 1,4-dichlorobenzene in particulates collected between the combustion chamber and the plasma furnace off-gas exit were 63 and 29 µg/kg respectively in Trials 2 & 4. These high concentrations (compared to those in slag) might be caused by carry-over of feeding materials, i.e. "short-circuit" from the feeding pot to the off-gas exit duct, or by short residence time, and can be improved by modifying the feeding method of solid materials, e.g. using oxygen to blow the feed to the furnace. Commercially, it would also be possible to recycle this secondary waste back to the plasma furnace.

By contrast, after the combustion chamber, the concentrations of 1,4-dichlorobenzene in particulates were below 5 µg/kg. This confirms that the combustion chamber assisted in destroying the majority of the remaining 1,4-dichlorobenzene by combusting it in oxygen-excess atmosphere and is therefore an essential part of the off-gas train.

The off-gas from Trial 4 was measured. The results show that the concentrations of 1,4-dichlorobenzene in the off-gas immediately exiting from the plasma furnace (before entering into the Combustion Chamber), sampled at different feeding stages, were lower than 8.12 mg/(N)m3, i.e. 6.5 ppm. In all cases the detected concentrations of dichlorobenzene compounds were below the quoted LOD for the analysis technique employed, as denoted by the '<' symbol.

During the feeding time of Trial 3, i.e. 4.1 hours, totally 0.320 kg of 1,4-dichlorobenzene was fed into the furnace. During the period, the total amount of 1,4-dichlorobenzene escaped into the off-gas duct (e.g. "shortcut" from feeding pipe to off-gas duct directly) was calculated and the result was 389.5 mg, which equaled to 0.12% of total input 1,4-dichlorobenzene.

The final emissions at the stack, after passing through the off-gas system (e.g. the combustion chamber, the baghouse filter, the wet scrubber). It should be noted that the emissions of both VOC and carbon monoxide are over release limits. The reason is that the combustion chamber was not hot enough. The temperature in the combustion chamber should be maintained at 1100° C. or above; however, due to the restriction of natural gas supply, the real temperature may be lower than 800° C.

| Pollutants | Sample 1 (11:37-12:07) | Sample 2 (12:46-13:16) | Sample 3 (13:17-13:36) |
|---|---|---|---|
| 1,2-Dichlorobenzene | <4.48 | <2.58 | <8.12 |
| 1,3-Dichlorobenzene | <4.48 | <2.58 | <8.12 |
| 1,4-Dichlorobenzene | <4.48 | <2.58 | <8.12 |
| Acetone | <4.48 | <2.58 | <8.12 |
| Methyl ethyl ketone | <2.24 | <1.29 | <4.06 |
| Styrene | <2.24 | <1.29 | <4.06 |
| Toluene | <2.24 | <1.29 | <4.06 |

Notes:
All concentrations expressed at 273 K, 101.3 kPa, dry gas (mg(N)m–3); The dichlorobenzene compounds were all analysed at the limit of detection (<10ug).

Process Gas Analysis (Sampling from the Exit of Plasma Furnace Off-Gas)

| Pollutants | Mass Emission Rate (gs–1) | Concentrations at 273 K, 101.3 kPa, dry gas (mg(N)m$^{-3}$) | Estimate of Error 2σ (95%) % | Release Limit (mg(N)m$^{-3}$) (WID-ELV) |
|---|---|---|---|---|
| TPM[1,2] | 0.0001 | 1.23 | ±48 | 10 |
| VOC (as carbon)[3] | 0.0035 | 58.1 | ±10 | 10 |
| Hydrogen | <0.0001 | 0.23 | ±8 | 10 |
| Chloride[2] | | | | |
| Sulphur Dioxide[2] | 0.0001 | 1.77 | ±8 | 50 |
| Hydrogen Cyanide[3] | <0.0001 | 0.02 | ±8 | n/a |
| $NO_x$ (as $NO_2$)[3] | 0.0009 | 14.58 | ±10 | 400 |
| Carbon Monoxide[3] | 0.0477 | 791.5 | ±10 | 50 |

Notes:
[1]Total Particulate Matter;
[2]Duplicate test (sampling periods 11:50-12:50 & 13:20-13:40);
[3]Continuous test (11:28-13:40);
[4]Data is uncorrected for oxygen.

Ultimate Emissions Testing

As demonstrated in the foregoing example, the trial results show simulated PCB wastes (containing 1,4-dichlorobenzene instead of real PCBs) can be successfully destroyed using a thermal plasma process over a broad range of compositions (e.g. 0.1~1.2% w/w of 1,4-dichlorobenzene in simulated wastes) at high destruction and removal efficiency (DRE).

The predicted specific melting energy, which was predicted at 0.22 kWh per kg of blended waste, by thermal modeling software, was confirmed in the trials and therefore endorsed the commercial operating model and the efficient characteristics of the process.

All the concentrations of 1,4-dichlorobenzene (to simulate PCBs) in the slag generated in the four trials, was below the analytical limit of detection (LOD), i.e. 5 µg/kg, which means that slag-based DREs were higher than 99.99996%. This also means the slag material is suitable for compliant disposal or re-use (subject to qualification). This endorses the recovery, as opposed to disposal, calibre of the technology presented. The technology was also demonstrated to be robust and non-selective in terms of DREs. This performance is attributed to the thermochemical design of the system, high furnace operating temperatures, photo-catalytic character of the light, sharp temperature gradients and desirable time versus temperature history.

The concentration of 1,4-dichlorobenzene in the raw off-gas from the plasma furnace was also below the limit of detection (LOD), i.e. 8.12 mg(N)m$^{-3}$ (or 6.5 ppm), which equate to a low gas phase partitioning of 0.122% w/w of 1,4-dichlorobenzene. This was measured at the immediate furnace exit and was confirmed to be further lowered by the use of a conventional off-gas system after the plasma furnace. This confirms that the PCBs are being successfully destroyed as opposed to being simply displaced.

Based on the results obtained from the trials, based on local unit cost assumptions, are estimated at £100 per tonne of PCB contaminated wastes, which after benchmarking, is confirmed to be highly competitive.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for the treatment of waste in a waste treatment system comprising a plasma treatment unit and an off-gas treatment system in communication with the plasma treatment unit, the waste comprising one or more hazardous organic components, the method comprising:
   plasma treating said waste in the plasma treatment unit to destroy the hazardous organic components and to yield a slag and an off-gas;
   wherein the one of more hazardous organic components are selected from persistent organic pollutants (POPs), ozone depleting substances (ODSs) and persistent, bioaccumulative and toxic (PBT) pollutants, and combinations of two or more thereof;
   wherein the waste comprises:
      (i) a soil and/or aggregate material; and
      (ii) an oil component which is a waste oil; and
   wherein, before plasma treating the waste, the waste comprises the one or more hazardous organic components and from 10 to 40% water by weight of the waste,
   wherein the plasma treatment is carried out in the presence of an oxidant in addition to the water present in the waste, namely, in the presence of a large amount of added oxygen gas of at least 20% by weight of the total weight of the waste,
   wherein the plasma treatment unit is a transferred-arc plasma treatment unit comprising:
      a reaction chamber having a base portion for holding the waste;
      a first electrode arranged above the waste and not in contact with the waste; and
      a second electrode in electrical contact with the base portion so that, in use, a plasma arc generated between the first and second electrodes passes through the waste; and
   the process further comprising directing the off-gas from the plasma treatment unit to a thermal oxidizer combustion chamber separate from the plasma treatment unit and combusting the off-gas at a temperature above 1100° C. in the thermal oxidizer combustion chamber;
   wherein the off-gas treatment system comprises the thermal oxidizer combustion chamber, filters, and a scrubber.

2. The method according to claim 1, wherein the waste is treated in a continuous process and the waste forms a waste stream.

3. The method according to claim 1, wherein the method comprises a step of blending (i) the soil and/or aggregate material, and (ii) the oil component to provide a substantially homogenous waste stream.

4. The method according to claim 1, wherein the waste oil is one or more of crude oil, diesel fuel, fuel oils and lubricants.

5. The method according to claim 2, wherein before the step of plasma treating the waste, the one or more hazardous organic components is contained in:
   (i) the soil and/or aggregate material; and/or
   (ii) the oil component; and/or
   (iii) the waste stream.

6. The method according to claim 1 wherein the oxygen gas is added in an amount of from 25 to 35% by weight of the total weight of the waste.

7. The method according to claim 1, wherein the plasma treatment of the waste is carried out at a temperature of at least 1100° C.

8. The method according to claim 1, wherein the plasma treatment of the waste is carried out at a temperature of from 1100° C. to 1800 C.

9. The method according to claim 1, wherein the hazardous organic component comprises said persistent organic pollutants (POPs).

10. The method according to claim 1, wherein the hazardous organic component is polychlorinated biphenyls (PCBs).

11. The method according to claim 1, wherein the method comprises retrieving a solid vitrified slag and/or an off-gas following the plasma treating of the waste.

12. The method according to claim 1, wherein the method comprises a step of adding of one or more of $SiO_2$, $CaO$ and $Al_2O_3$ to the waste.

13. The method according to claim 12, wherein the $SiO_2$:$CaO$:$Al_2O_3$ are added to provide a ratio of $SiO_2$:$CaO$:$Al_2O_3$ in the waste of:
   from 50 to 70% by weight $SiO_2$;
   from 20 to 30% by weight $CaO$; and
   from 10 to 20% by weight $Al_2O_3$.

14. The method according to claim 1, wherein before the step of plasma treating the waste, the one or more hazardous organic components is contained in:
   (i) the soil and/or aggregate material; and/or
   (ii) the oil component.

15. The method according to claim 1 wherein the plasma treatment is carried out in the presence of oxygen gas in an amount from
   20% to 40% by weight of the total weight of the waste.

16. The method of claim 1 wherein the directing the off-gas from the plasma treatment unit to the thermal oxidizer combustion chamber comprises ducting the off-gas directly from the plasma treatment unit to the combustion chamber via an off-gas duct.

* * * * *